(12) United States Patent
Bender

(10) Patent No.: US 8,915,458 B2
(45) Date of Patent: Dec. 23, 2014

(54) POULTRY LITTER MANAGEMENT DEVICE AND METHOD

(76) Inventor: Daniel Bender, Garfield, AR (US)

( * ) Notice: Subject to any disclaimer, the term of this patent is extended or adjusted under 35 U.S.C. 154(b) by 406 days.

(21) Appl. No.: 13/341,296

(22) Filed: Dec. 30, 2011

(65) Prior Publication Data

US 2012/0168545 A1 Jul. 5, 2012

Related U.S. Application Data

(60) Provisional application No. 61/430,038, filed on Jan. 5, 2011.

(51) Int. Cl.
*B02C 13/28* (2006.01)
*B02C 21/02* (2006.01)

(52) U.S. Cl.
CPC ............... *B02C 13/28* (2013.01); *B02C 21/02* (2013.01)
USPC ............... 241/101.72; 241/101.742; 241/193; 241/195

(58) Field of Classification Search
CPC B02C 2013/2816; B02C 13/28; B02C 13/04; B02C 13/026; B02C 21/02; B02C 13/02
USPC ................... 241/193, 195, 101.742, 101.763, 241/101.77, 101.78, 101.72
See application file for complete search history.

(56) References Cited

U.S. PATENT DOCUMENTS

| 1,147,351 | A | * | 7/1915 | Williams | 241/193 |
| 1,315,281 | A | * | 9/1919 | Campbell | 241/195 |
| 1,403,013 | A | * | 1/1922 | Cornwall | 241/194 |
| 2,718,741 | A | * | 9/1955 | Meldahl | 172/45 |
| 3,161,412 | A | * | 12/1964 | Ferris | 239/658 |
| 4,599,029 | A | * | 7/1986 | Zyduck | 414/297 |
| 4,619,412 | A | | 10/1986 | Willingham | |
| 4,711,403 | A | | 12/1987 | Gregory et al. | |
| 5,078,328 | A | | 1/1992 | Willingham | |
| 5,143,309 | A | | 9/1992 | Endom | |
| 5,593,888 | A | * | 1/1997 | Glaze et al. | 435/262.5 |
| 5,901,911 | A | | 5/1999 | Davis | |

* cited by examiner

*Primary Examiner* — Mark Rosenbaum
(74) *Attorney, Agent, or Firm* — Lathrop & Gage LLP

(57) ABSTRACT

A litter management device, such as a device configured to disintegrate and/or de-cake caked litter from poultry is described. In some embodiments, the litter management device includes a litter de-caking mechanism contained within a housing, which is supported by a movable frame. The litter de-caking mechanism includes one or more hammers flexibly attached, such as via chains, to a rotation bar, enabling the hammers to rotate in a circular motion around the rotation bar and within the housing. The rotation of the hammers causes the hammers to strike, often at high speeds, caked litter within a target area, which disintegrates the caked litter, allowing for the removal of the caked litter from an area generally used by poultry, among other benefits.

11 Claims, 6 Drawing Sheets

US 8,915,458 B2

POULTRY LITTER MANAGEMENT DEVICE AND METHOD

CROSS-REFERENCE TO RELATED APPLICATIONS

This application claims the benefit of U.S. Provisional Application No. 61/430,038, filed Jan. 5, 2011, entitled POULTRY LITTER MANAGEMENT DEVICE AND METHOD, which is incorporated by reference in its entirety.

BACKGROUND OF THE INVENTION

When poultry (e.g., turkeys or chickens) drink from a water source, a ring of hardened litter can form into a hardened litter cake around the water source, causing problems, such as harming the feet of the poultry. Because of this, persons often have to physically break up the cake material in order to remove the material and provide a cake-free area for the poultry.

Persons may utilize machines in order to break up and remove caked litter, such as machines pulled by tractors or other farm equipment. Conventional machines are generally large and cumbersome, having complicated and costly rotation mechanisms incapable of adapting to different types of terrain, different sized areas of caked litter, and so on. These and other problems exist with respect to conventional litter disintegration machines.

BRIEF DESCRIPTION OF THE SEVERAL VIEWS OF THE DRAWINGS

Illustrative embodiments of the present technology are described in detail below with reference to the attached drawing figures, which are incorporated by reference herein and wherein.

DETAILED DESCRIPTION

Overview

The present technology provides devices and methods for disintegrating, removing, and/or otherwise managing poultry litter. In some embodiments, a litter management device includes a litter de-caking mechanism that operates one or more hammer arms to disintegrate caked litter. The litter management device may be configured to be pushed or pulled, either by a human or a vehicle, or may be configured to operate as a vehicle.

In some embodiments, the litter de-caking mechanism includes a rotating hammer device configured to rotate multiple hammer arms about an axis parallel to a target area of caked litter, causing hammers positioned on ends of flexible hammer arms to strike and disintegrate caked litter within the target area.

Thus, in some embodiments, a device configured to disintegrate and/or de-cake caked litter from poultry is described. The litter management device includes a litter de-caking mechanism contained within a housing, which is supported by a movable frame. The litter de-caking mechanism includes one or more hammers flexibly attached, such as via chains, to a rotation bar, enabling the hammers to rotate in a circular motion around the rotation bar and within the housing. The rotation of the hammers causes the hammers to strike, often at high speeds, caked litter within a target area, which disintegrates the caked litter, allowing for the removal of the caked litter from an area generally used by poultry, among other benefits.

The Litter Management Device

Figure 1:
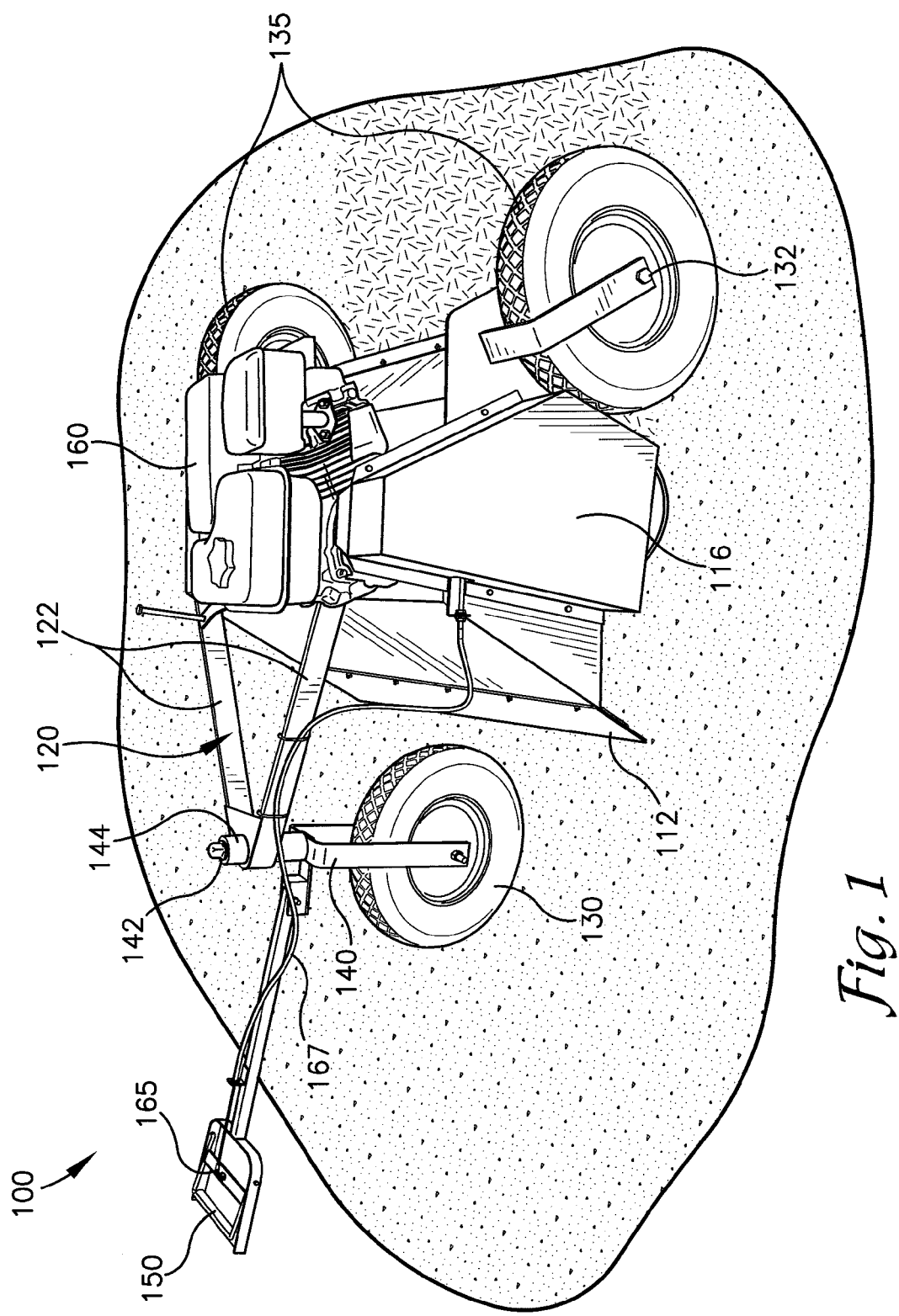
FIG. 1 is a perspective view of a litter management device.
Figure 2:
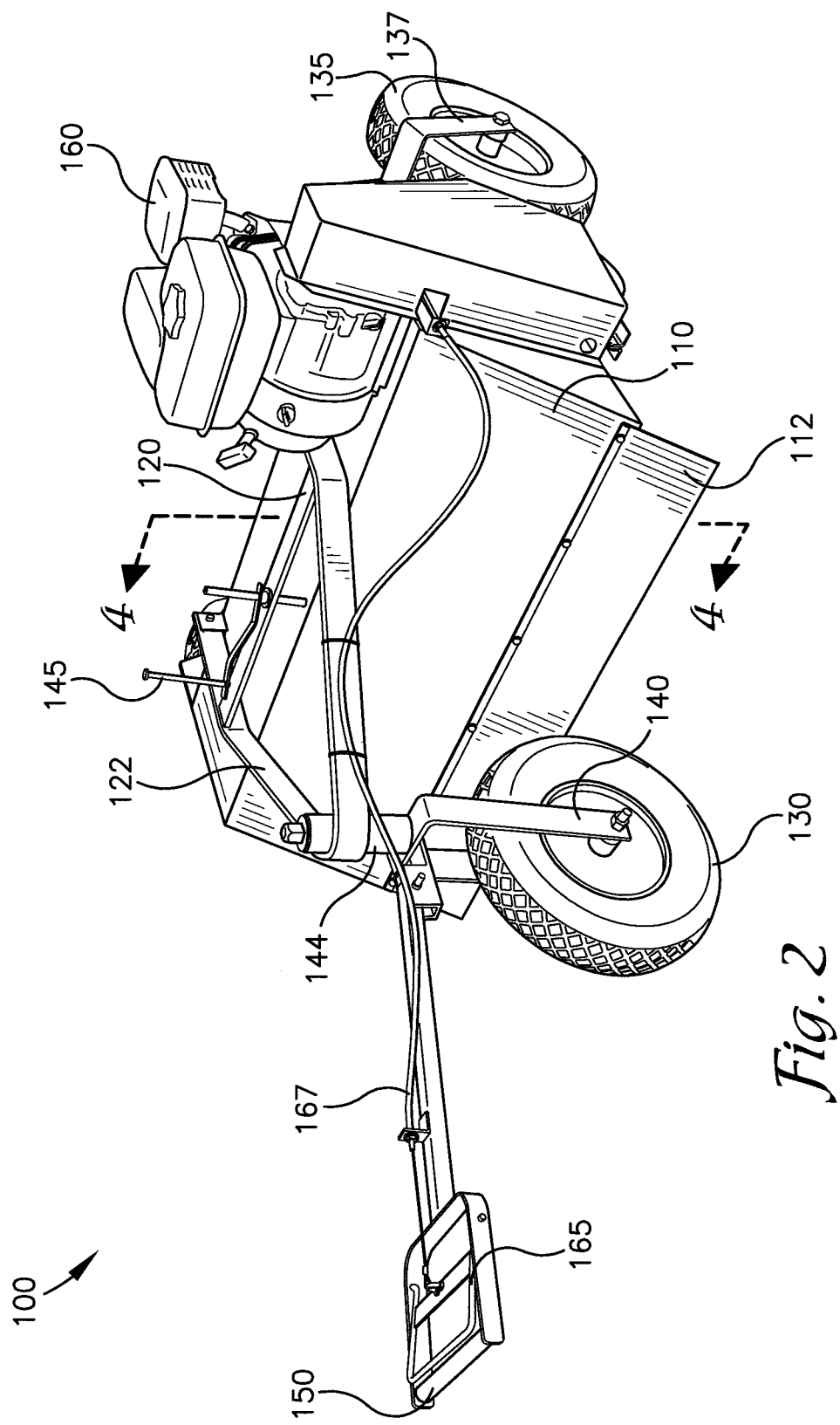
FIG. 2 is an alternate perspective view of the litter management device.
Figure 3:
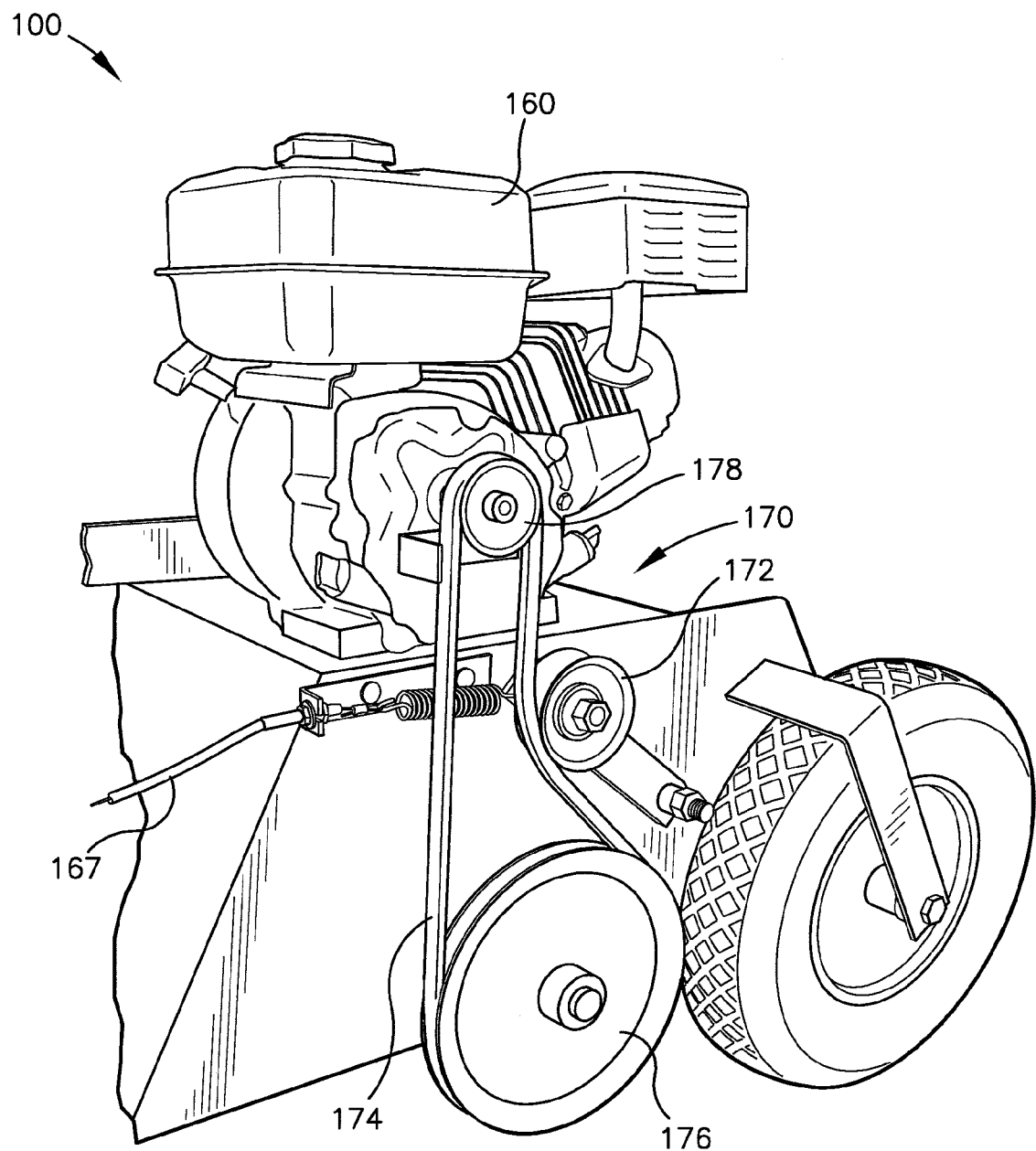
FIG. 3 is a perspective view of an engine used to operate the litter management device.

FIGS. 1, 2, and 3 depict a suitable litter management device 100. The litter management device 100 includes a housing 110 that contains a litter de-caking mechanism, such as a protective, hood-like structure. The housing 110 is configured to partially or completely contain the litter de-caking mechanism in order to shield a user from debris during operation of the device 100, to protect the user from the litter de-caking mechanism, to selectively deposit and/or remove disintegrated littler during operation of the device 100, and so on. In addition, the housing may include a rubber flap 112 at a back lower edge to prevent fly-back of the broken up litter debris, among other things.

The housing 110 is mounted to a frame 120. The frame 120 is hingedly or removably mounted towards a back section of the housing 110. Forward bars 122 of the frame 120 extend forward and outward to support a front wheel 130, which extends downwards and away from the housing 110. Two rear wheels 135 are mounted to the housing 110 using bolts 137 or other attachment devices.

In some embodiments, the front wheel 130 is mounted between two forked portions of a support member 140. A vertical rod 142 on an upper portion of the support member extends up through bearings into a cylindrical outer sleeve 144, enabling the front wheel to pivot. As depicted, two substantially parallel arms extend forward and support a crosswise forward portion of the frame 120, which attaches to the outer sleeve 144. In some embodiments, the forwardly extending portion of the frame 120 wraps around the outer sleeve 144 to form a "V" shape, or may be formed in other configurations.

In some embodiments, the litter management device 100 includes a vertical adjustment mechanism, such as a mechanism that includes and/or is controlled by a hand crank 145, that enables the device 100 to lower or raise the litter de-caking mechanism with respected to a target area. The vertical adjustment mechanism may be located between the front wheel 130 and the hinges.

For example, the vertical adjustment mechanism (not shown) may include a downwardly extending vertical crankshaft having threads which mate with corresponding threads made inside a vertical bore on the frame 120. The lower end of the vertical crankshaft may be pivotally fixed to the housing 110, causing the housing 110 to be lowered or raised, depending on the direction of rotation. When the housing 110 is lowered, the rear edge of the housing 110 drops relative to the rear wheels and the litter de-caking mechanism is able to dig into the cake being broken up.

In some embodiments, the vertical adjustment mechanism is located between the front wheel cylinder and the hinges, such that when the housing 110 is lowered, the forward edge of the housing 110 drops relative to the rear wheels and the litter de-caking mechanism is able to dig into the cake being removed. Therefore, the vertical adjustment mechanism may facilitate selecting a depth to which the litter de-caking mechanism engages a target area of caked litter, among other benefits.

In some embodiments, the device 100 includes a handle 150 attached to the forwardly extending metal bar on the front of the frame 120. The handle 150, which may be attached at other locations, facilitates moving the device 100 over targeted caked litter areas. Of course, one of ordinary skill will realize that the device 100 may include other components that facilitate movement of the device 100, such as a hitch that enables the device 100 to be pulled behind a small tractor, four-wheeler, or other motorized vehicle.

In some embodiments, the litter management device 100 includes an engine or motor 160, which is used to operate the litter de-caking mechanism located within the housing 110. The motor 160 is connected to the litter de-caking mechanism using a pulley and lever system 170, which includes a lever wheel 172 pressing against the outside of a belt 174, a drive wheel 176, and an idle wheel 178. The idle wheel 178 is coaxially located about the shaft, which goes through the housing 110, causing the litter de-caking mechanism to rotate during operation of the device 100. For example, during operation, the idle wheel 178 may be driven using a lever, such as a handle trigger 165, that creates or eliminates slack in the belt 174 between the drive wheel 176 and the idle wheel 178.

As discussed above, the motor 160, and, therefore, the litter de-caking mechanism, may be controlled by a lever or other user operated control mechanism, such as a handle trigger 165, which connects to the motor 160 via a cord 167 or other suitable connector. Of course, the litter management device 100 may incorporate other control mechanism and/or techniques in order to operate the litter de-caking mechanism contained within the housing 110.

The Litter De-Caking Mechanism

As described herein, in some embodiments, the litter management device 100 includes a litter de-caking mechanism that incorporates and utilizes rotatable hammers in order to disintegrate and/or otherwise manage caked litter, such as caked litter from poultry.

Figure 4A:
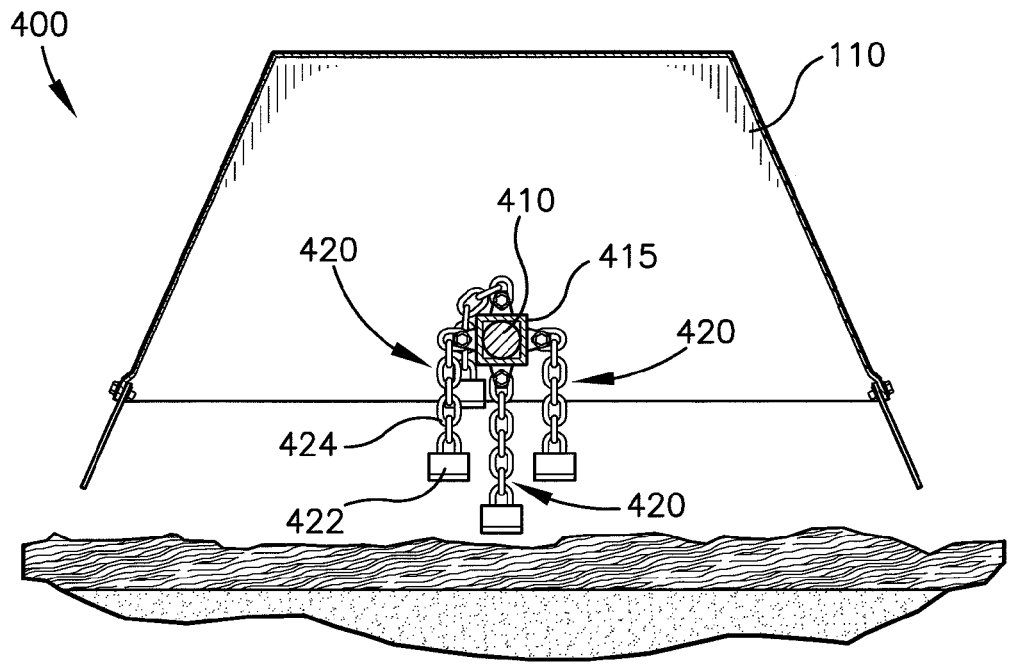
FIGS. 4A-4B are cross-sectional views of a litter de-caking mechanism utilized by the litter management device.
Figure 4B:
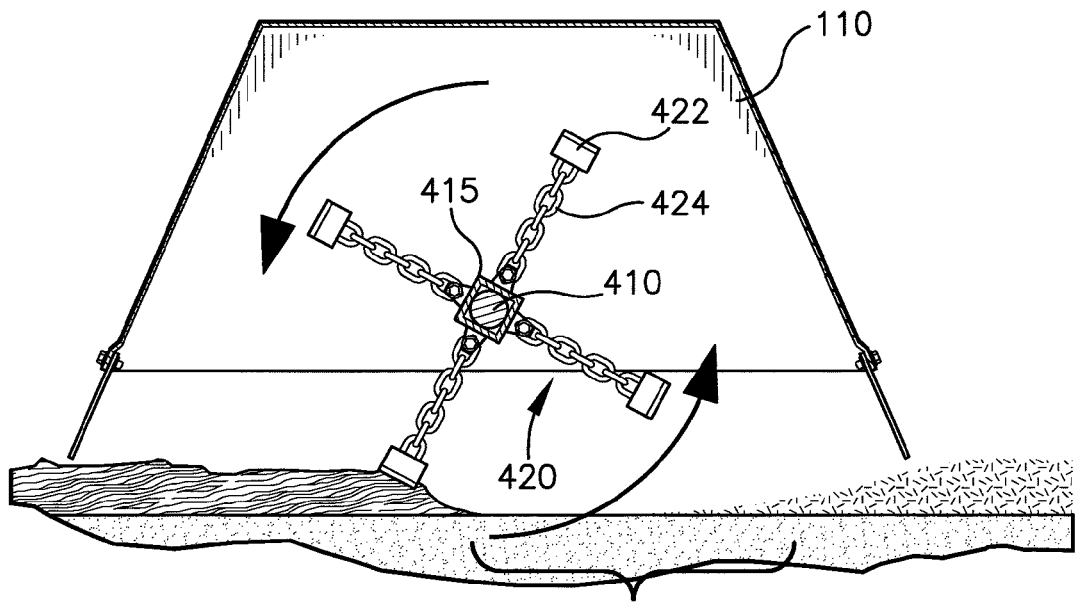

FIGS. 4A-4B depict a cross-sectional view of a litter de-caking mechanism 400 utilized by the litter management device 100. The litter de-caking mechanism 400 includes a rotation bar 410, a rotation bar tube 415, and one or more hammer arms 420, each having a hammer 422 and a chain 424 that flexibly attaches the hammer 422 to the rotation bar tube 415.

In some embodiments, in order to rotate, the rotation bar 410 connects to bearings and extends through the housing 110 within the rotation bar tube 415 into a receiving area of the housing 110, where it is connected via bearings to the pulley 162.

As shown in FIG. 4B, during operation of the litter de-caking mechanism, the hammers 422 rotate approximately about a longitudinal axis of the rotation bar 410. That is, the hammers 422, attached to the rotation bar tube 415 via the chains 424, rotate in a generally circular motion about the rotation bar 415 within a plane that is generally perpendicular to a target surface, such as an area of caked litter 430 on the ground under the device 100. The rotation causes the hammers 422 to strike and disintegrate the target area of caked litter 430. That is, the hammers 422 swing at high speed about the rotation bar 410 in order to impact caked litter and push, lift, and/or direct (effectively scooping) disintegrated debris into the housing 110, among other things.

Figure 5:
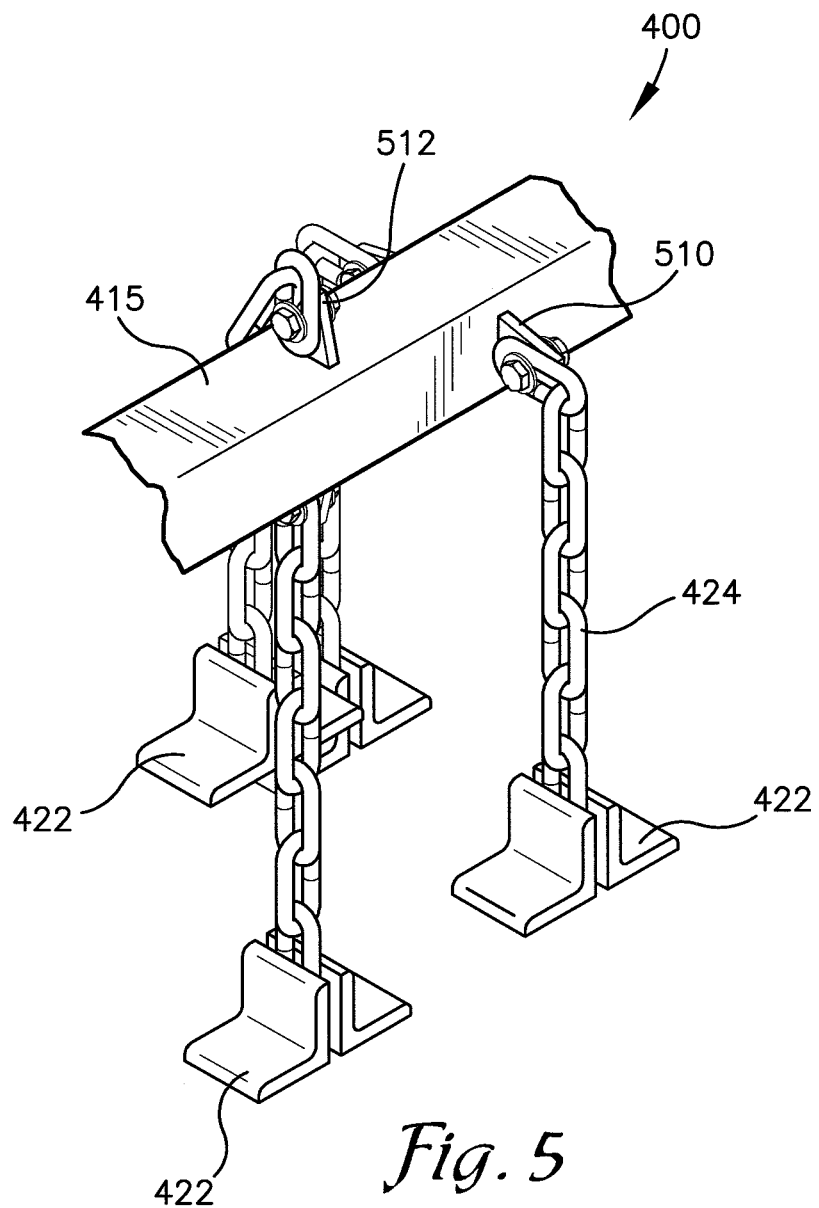
FIG. 5 is a perspective view of a rotating hammer device of the littler de-caking mechanism.

As shown in FIG. 5, triangular members 510 are welded onto the rotation bar tube 415. For example, the triangle members 510 are welded to the outside of the rotation bar tube 415. At a truncated end, 512, each triangular member 510 has a hole bored through in order to removably fix a chain 424 of a hammer arm 420 to the rotation bar tube 415.

Figure 6:
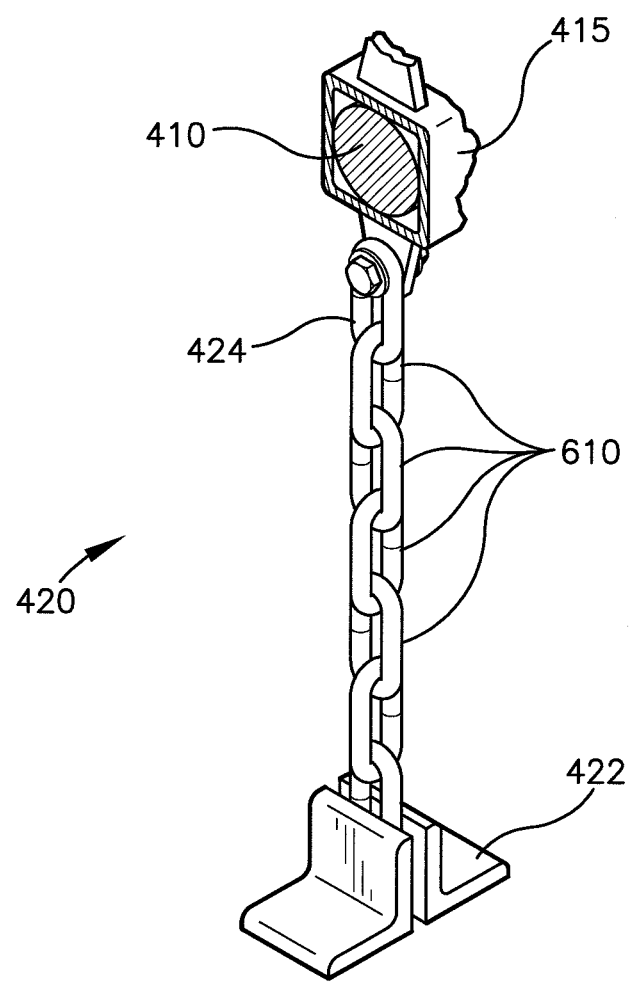
FIG. 6 is a perspective view of a hammer arm of the rotating hammer device.

As shown in FIG. 6, the chains 424 of the hammer arms 420 include seven links 610 to connect the hammers 422 to the rotation bar tube 415, although fewer or more links may be utilized. The hammers 422 may be formed from angle irons, and are welded together to the last link 612 of the chains 424. In some cases, the hammers 422 include apertures that facilitate attachment to the chains 424.

Although the litter de-caking mechanism 400 is shown in FIGS. 4-6 having a certain configuration, one of ordinary skill in the art will realize other configurations are possible. For example:

The mechanism 400 may include one, two, three, four, or any number of hammer arms 420;

The mechanism 400 may include hammer arms 420 having different chain lengths, and, thus, different radii of rotation. For example, the mechanism 400 may include three hammer arms 420 having a progressively longer length to facilitate selective or certain impact angles or techniques;

The mechanism may include hammer arms 420 spaced evenly around the rotation bar tube 415, unevenly around the rotation bar tube 415, or spaced in a variety of different spatial configurations around the rotation bar tube 415;

The mechanism may include different shaped hammers 422, such as hammers 422 that are generally cylindrical, generally linear, have multiple impact faces, having cross sections of virtually any geometry, and so on; and/or The mechanism may be configured such that hammer arms 420 rotate in three-dimensional space about the rotation bar. That is, a hammer arm 420 may rotate across many planes of rotation during operation of a device 100; and so on.

Thus, a litter management device may include a rotating mechanism that provides hammers flexibly attached to a rotation bar in order to rotate the hammers at sufficient speeds and through sufficient two- or three-dimensional spaces in order to cause the hammers to impact a targeted area of caked litter, which causes the caked litter to break up and/or disintegrate, among other benefits.

CONCLUSION

Many different arrangements of the various components depicted, as well as components not shown, are possible without departing from the spirit and scope of the present technology. Embodiments of the present technology have been described with the intent to be illustrative rather than restrictive. Alternative embodiments will become apparent to those skilled in the art that do not depart from its scope. A skilled artisan may develop alternative means of implementing the aforementioned improvements without departing from the scope of the present technology.

It will be understood that certain features and subcombinations are of utility and may be employed without reference to other features and subcombinations and are contemplated within the scope of the claims. Not all steps listed in the various figures need be carried out in the specific order described.

I claim:

1. A litter maintenance device, comprising:
   a frame;
   a housing attached to at least a portion of the frame at a rear end of the frame, the housing having a hood section;
   a front wheel attached to a front end of the frame;
   two back wheels attached to the housing;

an independent motor attached to at least a portion of the frame or a portion of the housing;

a rotation mechanism attached to the motor; and a litter de-caking mechanism at least partially located within the hood section of the housing, wherein the litter de-caking mechanism includes:

a rotation bar connected to the rotation mechanism attached to the motor;

a rotation bar tube that receives the rotation bar;

one or more hammer arms attached to the rotation bar tube, wherein each of the hammer arms includes a hammer and at least one chain having a first end that connects to the rotation bar tube, the chain having a second end attached to the hammer;

each hammer, when looked at in a cross section, being angled laterally outward.

2. The litter maintenance device of claim 1, further comprising:

a vertical adjustment mechanism configured to raise or lower the litter de-caking mechanism with respect to a target area of caked litter.

3. The litter maintenance device of claim 1, further comprising:

a handle attached to the front end of the frame and configured to facilitate movement of the device.

4. The litter maintenance device of claim 1, wherein the litter de-caking mechanism includes three hammer arms attached to the rotation bar tube at approximately equal distances from one another.

5. The litter maintenance device of claim 1, wherein each hammer is formed of two angle irons, a first of the two angle irons having a back attached to the chain.

6. The litter de-caking mechanism of claim 1, wherein the litter de-caking mechanism includes two or more hammer arms of different lengths.

7. The litter de-caking mechanism of claim 1, wherein the litter de-caking mechanism includes two or more hammer arms configured to rotate within different planes of rotation with respect to one another.

8. The litter de-caking mechanism of claim 1, wherein the one or more hammer arms are removably attached to the rotation bar such that the one or more hammer arms rotate around a longitudinal axis of the rotation bar.

9. A litter maintenance machine, comprising:

a housing that is at least partially open in a downward direction;

a frame configured to move the housing over a target area of caked litter;

a litter de-caking mechanism contained within the housing that includes a rotation bar and one or more hammers flexibly connected to the rotation bar;

the hammers having laterally-extending portions for use in engaging a litter cake.

10. The litter maintenance machine of claim 9, further comprising:

a motor attached to the housing and the frame and configured to rotate the rotation bar during operation of the machine.

11. The litter maintenance machine of claim 9, further comprising:

a handle trigger attached to the frame; and a motor attached to the housing and the frame and connected to the trigger via a cord, wherein the motor includes a pulley and lever system configured to rotate the rotation bar during operation of the machine in response to movement of the trigger.

* * * * *